United States Patent
Ezzat et al.

(10) Patent No.: US 9,403,318 B2
(45) Date of Patent: Aug. 2, 2016

(54) HEAT STAKE JOINING OF ADHESIVELY BONDED THERMOPLASTIC COMPONENTS

(71) Applicant: GM GLOBAL TECHNOLOGY OPERATIONS LLC, Detroit, MI (US)

(72) Inventors: Hesham A. Ezzat, Troy, MI (US); Joseph M. Polewarczyk, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 13/761,440

(22) Filed: Feb. 7, 2013

(65) Prior Publication Data
US 2014/0219710 A1    Aug. 7, 2014

(51) Int. Cl.
*B25G 3/34* (2006.01)
*F16B 11/00* (2006.01)
(Continued)

(52) U.S. Cl.
CPC .............. *B29C 65/30* (2013.01); *B29C 65/18* (2013.01); *B29C 65/52* (2013.01); *B29C 65/72* (2013.01); *B29C 66/1122* (2013.01); *B29C 66/126* (2013.01); *B29C 66/21* (2013.01);
(Continued)

(58) Field of Classification Search
CPC .... B23K 11/00; B23K 11/0026; B23K 11/18; F16B 5/08; B29C 65/8261; B29C 66/0242; B29C 66/30321; B29C 66/30325; B29C 65/13; B29C 65/30; B29C 65/483; B29C 66/21; B29C 66/41; B29C 66/45; B29C 66/52; B29C 66/72; B29C 66/126; B29C 66/545; B29C 66/1122; B29C 66/73921; B29C 66/8322; B29C 66/81431; B29C 66/919; B29C 66/91421; B29C 66/91655; B29C 66/91933; Y10T 403/477
USPC ........... 403/270, 271; 156/275.1, 27.3, 273.5, 156/290, 292, 308.4, 309.9
See application file for complete search history.

(56) References Cited

U.S. PATENT DOCUMENTS 3,511,655 A  *  5/1970  Haas ...................... G03C 11/08
                                                     283/109
3,683,806 A  *  8/1972  Rudolph .................. G07F 7/08
                                                     101/401.1
(Continued)

FOREIGN PATENT DOCUMENTS

| CN | 1436674 A1 | 8/2003 |
| CN | 101663156 A | 3/2010 |
| EP | 1600272 A1 | 11/2005 |

*Primary Examiner* — Gregory Binda
*Assistant Examiner* — Nahid Amiri
(74) *Attorney, Agent, or Firm* — Quinn Law Group, PLLC

(57) ABSTRACT

A method of joining a first thermoplastic component with a second thermoplastic component includes abutting a joint surface of the first thermoplastic component against a joint surface of the second thermoplastic component. The first thermoplastic component includes a thermoplastic protrusion extending from the joint surface, and the joint surface of the second thermoplastic component defines a receiving pocket adapted to receive the thermoplastic protrusion. Abutting a joint surface of the first thermoplastic component against a joint surface of the second thermoplastic component further includes inserting the thermoplastic protrusion into the receiving pocket. Once abutted, thermal energy is applied to a heat-apply surface of the second thermoplastic component, that is opposite the joint surface. The thermal energy is sufficient to melt a portion of the thermoplastic protrusion and a portion of the joint surface of the second thermoplastic component.

3 Claims, 2 Drawing Sheets

(51) Int. Cl.
*F16B 12/04* (2006.01)
*F16L 13/00* (2006.01)
*B29C 65/30* (2006.01)
*B29C 65/18* (2006.01)
*B29C 65/52* (2006.01)
*B29C 65/72* (2006.01)
*B29C 65/00* (2006.01)
*B29C 65/48* (2006.01)

(52) U.S. Cl.
CPC ............... *B29C 66/41* (2013.01); *B29C 66/45* (2013.01); *B29C 66/545* (2013.01); *B29C 66/73921* (2013.01); *B29C 66/81431* (2013.01); *B29C 66/8322* (2013.01); *B29C 66/91421* (2013.01); *B29C 66/91933* (2013.01); *B29C 65/483* (2013.01); *B29C 66/81423* (2013.01); *B29C 66/919* (2013.01); *B29C 66/91655* (2013.01); *Y10T 403/477* (2015.01)

(56) References Cited

U.S. PATENT DOCUMENTS

| | | | | |
|---|---|---|---|---|
| 4,386,123 | A * | 5/1983 | Coburn, Jr. | 428/29 |
| 4,656,072 | A * | 4/1987 | Coburn et al. | 428/41.6 |
| 4,925,507 | A * | 5/1990 | Yamaguchi | 156/73.1 |
| 5,688,421 | A * | 11/1997 | Walton | 219/230 |
| 7,343,872 | B2 * | 3/2008 | Taylor et al. | G01K 1/02 116/216 |
| 8,277,922 | B2 * | 10/2012 | Tuman et al. | 428/119 |
| 2002/0074692 | A1 * | 6/2002 | Wang | 264/293 |
| 2005/0179984 | A1 * | 8/2005 | Liang et al. | 359/296 |
| 2006/0151570 | A1 | 7/2006 | Shinkawa et al. | |
| 2008/0239216 | A1 * | 10/2008 | Miyamoto et al. | 349/113 |
| 2009/0180172 | A1 * | 7/2009 | Murakami | 359/296 |

\* cited by examiner

HEAT STAKE JOINING OF ADHESIVELY BONDED THERMOPLASTIC COMPONENTS

TECHNICAL FIELD

The present invention relates generally to methods of joining thermoplastic components.

BACKGROUND

Staking is the process of connecting two components by creating an interference fit between the two pieces. One workpiece has a hole in it while the other has a protrusion that fits within the hole. The protrusion is often undersized so that it may slip into the hole. A punch may then be used to compress the boss radially and form an interference fit between the workpieces. This can form a permanent joint. Thermoplastic staking, also known as heat staking, is the same process except that it uses heat to deform the plastic boss. In each example, the protrusion is typically exposed through the hole in the upper workpiece. Additional adhesives are often avoided to secure the workpieces, because they often have a tendency to be expelled through the hole, and may collect on and/or contaminate the die or punch used to deform the protrusion.

SUMMARY

A thermoplastic joint assembly includes a base plate and a top plate. The base plate is formed from a thermoplastic material, and includes a first joint surface with a thermoplastic protrusion extending from the first joint surface. The top plate is likewise formed from a thermoplastic material, and includes a second joint surface configured to mate with the first joint surface, and a heat-apply surface opposite the second joint surface. The top plate defines a receiving pocket extending from the second joint surface into the top plate, however, the receiving pocket does not extend through the heat-apply surface. The receiving pocket is particularly adapted and/or dimensioned to receive the protrusion of the base plate when the first joint surface abuts the second joint surface. Additionally, an adhesive material may be disposed between and in contact with each of the first joint surface and the second joint surface.

A thermal die having a temperature above the melting point of the thermoplastic may be configured to contact a portion of the heat-apply surface of the top plate and conduct thermal energy into the top plate. The conducted thermal energy is sufficient to melt a portion of the top plate proximate the receiving pocket and to melt the protrusion of the base plate such that the top plate and base plate locally fuse together when the thermal energy is removed. In one configuration, the thermal die may include a resistive heating element.

In one configuration, the heat-apply surface of the top plate may include a domed portion opposite the receiving pocket. Likewise, the thermal die may include a concave portion adapted to receive and flushly contact the domed portion of the top plate. The thermal die would then be configured to conduct thermal energy into the top plate through the domed portion of the top plate.

A method of joining a first thermoplastic component with a second thermoplastic component begins by abutting a joint surface of the first thermoplastic component against a joint surface of the second thermoplastic component. The first thermoplastic component includes a thermoplastic protrusion extending from the joint surface, and the joint surface of the second thermoplastic component defines a receiving pocket adapted to receive the thermoplastic protrusion. Abutting a joint surface of the first thermoplastic component against a joint surface of the second thermoplastic component includes inserting the thermoplastic protrusion into the receiving pocket.

The method further includes: applying thermal energy to a heat-apply surface of the second thermoplastic component, wherein the heat-apply surface is opposite the joint surface of the second thermoplastic component; and melting a portion of the thermoplastic protrusion and a portion of the joint surface of the second thermoplastic component using the applied thermal energy.

Applying thermal energy to a heat-apply surface of the second thermoplastic component may further include: contacting the heat-apply surface with a die; and transmitting thermal energy to the second thermoplastic component via conduction. The thermal energy may be generated within the die using a resistive heating element. In one configuration, the die may include a concave portion, and the heat-apply surface may include a domed portion. Contacting the heat-apply surface with a die may then include nesting the domed portion within the concave portion of the die; and transmitting thermal energy to the second thermoplastic component may correspondingly include conducting thermal energy through the domed portion. The domed portion of the second thermoplastic component may be opposite the receiving pocket of the second thermoplastic component.

The method may further include applying an adhesive material between the joint surface of the first thermoplastic component and the joint surface of the second thermoplastic component prior to abutting the two against each other. The method may conclude by cooling the melted portion of the thermoplastic protrusion and the melted portion of the joint surface of the second thermoplastic component to fuse the first thermoplastic component with the second thermoplastic component.

The above features and advantages and other features and advantages of the present invention are readily apparent from the following detailed description of the best modes for carrying out the invention when taken in connection with the accompanying drawings.

DETAILED DESCRIPTION

Figure 1:
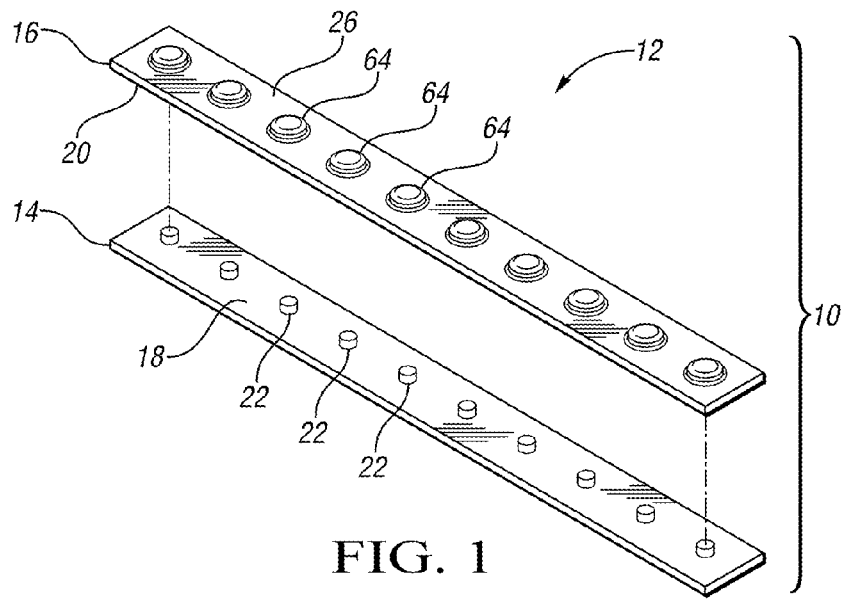
FIG. 1 is a schematic exploded isometric view of a thermoplastic joint assembly including a top and base plate.

Referring to the drawings, wherein like reference numerals are used to identify like or identical components in the various views, FIG. 1 schematically illustrates an exploded view 10 of a thermoplastic joint assembly 12 that includes a base plate 14 and a top plate 16. The respective plates 14, 16 may be portions of larger components that are required to be joined.

The present disclosure should not be limited by the physical characteristics of the components to which the base plate 14 and top plate 16 belong.

Each of the base plate 14 and top plate 16 may be formed from a thermoplastic material. A thermoplastic is a polymer that becomes pliable or moldable above a specific temperature, and returns to a solid state upon cooling. Thermoplastics differ from thermosetting polymers, which form irreversible chemical bonds during the curing process; thermoset bonds break down upon melting and do not reform upon cooling. Examples of thermoplastic materials that may be used in the present technique include Acrylics, Fluoroplastics (e.g., Polytetrafluoroethylene (PTFE)), Polyamides, Polyethylenes, Polyetheretherketone (PEEK), and Polyvinyl chlorides (PVC).

The base plate 14 may include a joint surface 18 that may be dimensioned such that it may abut and mate with a corresponding joint surface 20 of the top plate 16. The joint surface 20 of the top plate 16 is further illustrated in FIG. 2. With continued reference to FIG. 1, the joint surface 18 of the base plate 14 may include one or more thermoplastic protrusions 22 extending outward from the surface 18. In one configuration, the thermoplastic protrusions 22 may be cylindrical in nature, and may extend approximately 1.0 mm to 10.0 mm outward from the surface 18. In other configurations, the protrusions 22 may have a square or triangle cross-sectional profile, and/or may be conical or pyramidal.

Figure 2:
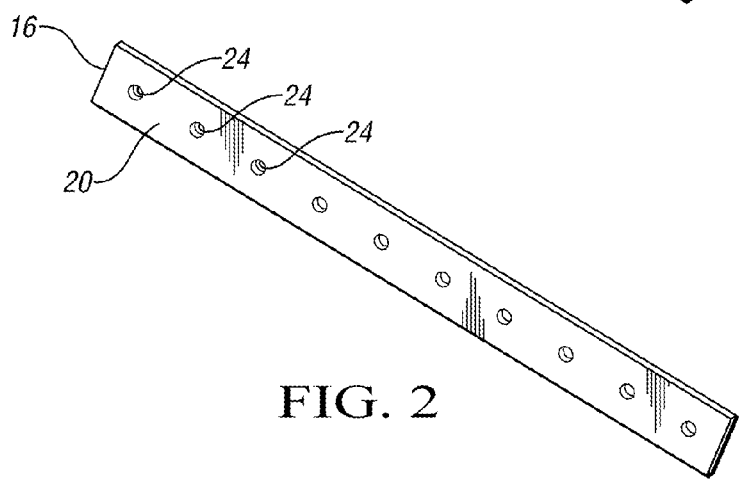
FIG. 2 is a schematic isometric view of the underside of the top plate illustrated in FIG. 1.
Figure 3:
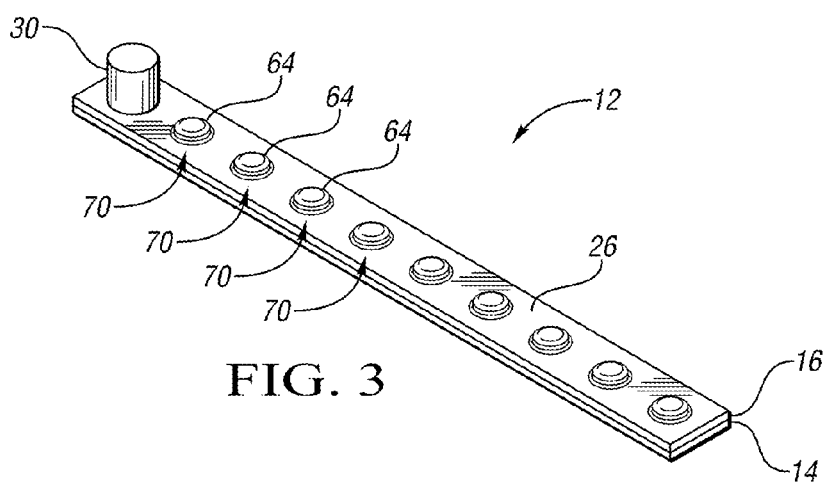
FIG. 3 is a schematic isometric view of an assembled thermoplastic joint assembly.

As schematically illustrated in FIG. 2, the top plate 16 may define one or more receiving pockets 24. Each receiving pocket 24 may respectively extend from the surrounding joint surface 20 into the top plate 16. The one or more receiving pockets 24 may be positioned and/or dimensioned such that each of the one or more thermoplastic protrusions 22 may extend into a corresponding receiving pocket 24 when the joint surface 18 of the base plate 14 is abutted against the joint surface 20 of the top plate 16, as generally illustrated in FIG. 3. As such each thermoplastic protrusion 22 may extend within the body of the top plate 16.

The top plate 16 may include a heat-apply surface 26 that is opposite the joint surface 20. The heat-apply surface 26 may be a continuous surface that is unpenetrated by the various receiving pockets 24 from the opposite side. Said another way, in the present configuration, the various receiving pockets 24 do not extend through the heat-apply surface 26.

Referring to FIG. 3, a thermal die 30 may be configured to contact the heat-apply surface 26 of the top plate 16 to facilitate the joining of the top plate 16 with the base plate 14. As shown in the schematic partial cross-sectional view 40 provided in FIG. 4, the thermal die 30 may be a thermally conducting element, such as aluminum, steel, or another metal, and may include a heat source 32, such as a resistive heating element 34. The heat source 32 may be adapted to heat the thermal die 30 to a temperature above the melting point of the thermoplastic material of the top and base plates 16, 14. For example, in one configuration, the thermal die 30 may be heated to a temperature of above 350 degrees Celsius. In the case of a resistive heating element 34, the temperature of the die 30 may be regulated by modulating the amount of current passing through the resistive heating source from a coupled current source 36.

Figure 5:
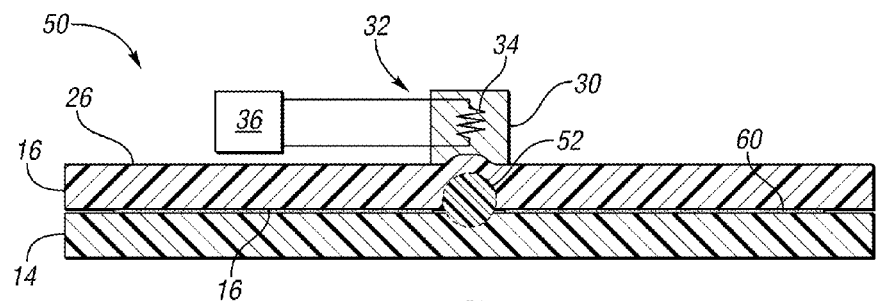
FIG. 5 is a schematic cross-sectional view of a thermoplastic joint assembly.

As generally illustrated in the partial schematic view 50 of the joint assembly 12 provided in FIG. 5, the thermal die 30 may contact a portion of the heat-apply surface 26 of the top plate 16, wherein it may conduct thermal energy into the top plate 16. The conducted thermal energy may be sufficient to melt a portion of the top plate 16 proximate to the receiving pocket 24 and also melt some or all of the protrusion 22 extending from the base plate 14. In doing so, the melted thermoplastic may intermix in a local area 52 that may solidify and fuse the top plate 16 with the base plate 14 once the thermal energy and/or thermal die 30 is removed.

Figure 4:
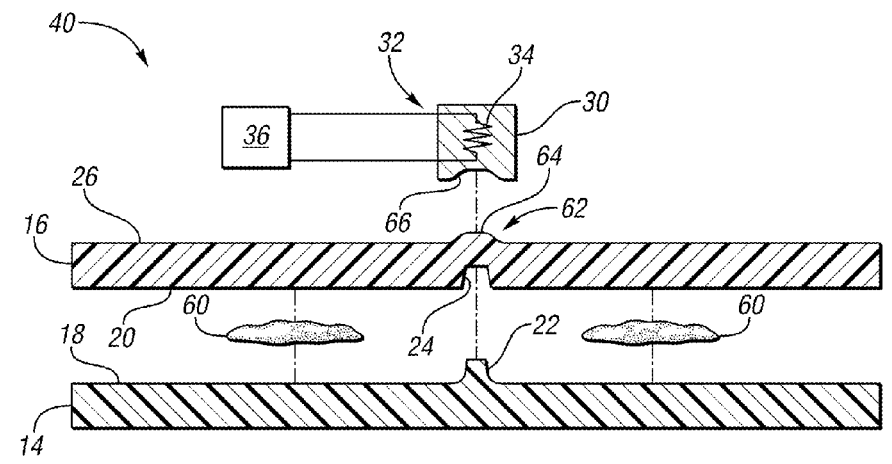
FIG. 4 is a schematic exploded cross-sectional view of a thermoplastic joint assembly.

As can be further seen in FIGS. 4 and 5, an adhesive material 60 may be disposed between the joint surface 18 of the base plate 14 and the joint surface 20 of the top plate 16. The adhesive material 60 may include an epoxy, a cyanoacrylate adhesive, a silicone adhesive, or another known adhesive. The adhesive material 60 may have a sufficiently low viscosity to evenly distribute itself between the top and base plates 16, 14 when the plates are brought into close contact, as shown in FIG. 5.

To prevent the adhesive from flowing onto the heat-apply surface 26, where it may contact the thermal die 30, a land portion 62 of the top plate 16 may separate the receiving pocket 24 from the heat-apply surface 26. In one configuration, this land portion 62 together with the proximate heat-apply surface 26 may include a domed portion 64. The domed portion 64 may provide a quick reference identifier as to the location of the thermoplastic protrusions 22 and corresponding receiving pockets 24 (i.e. for joining purposes). Additionally, the thermal die 30 may include a concave portion 66 that may be adapted to receive and flushly contact the domed portion 64 of the heat-apply surface 26. In this manner, the domed portion 64 may be operative to increase the contacting surface area and/or heat transfer surface area between the thermal die 30 and the top plate 16. As such, the thermal die 30 may be configured to conduct thermal energy into the top plate 16 through the domed portion 64 of the top plate 16.

Referring again to FIG. 3, throughout a joint assembly 12, there may be a plurality of local areas 70 that may each be thermally joined through the present heat-staking method, whereby a thermal die 30 individually melts a protrusion 22 extending within a receiving pocket 24 of an adjoining plate. Each heat-staked local area may be identified by a domed portion 64 of the heat-apply surface 26 that may be directly opposite the respective receiving pocket 24. Either in a sequential manner, or through the use of multiple thermal dies, each local area 70 may be melted and re-solidified to thermally fuse the top plate 16 to the base plate 14. The aforementioned adhesive material 60 may be disposed, for example, between each of the respective local areas 70 to further join the top plate 16 with the base plate 14.

Figure 6:
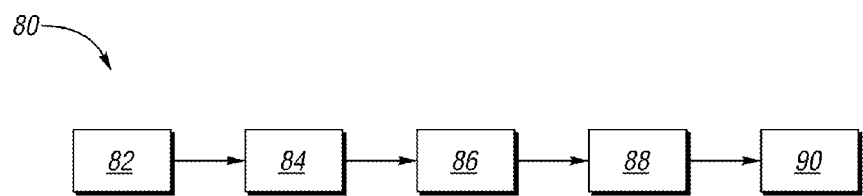
FIG. 6 is a flow diagram illustrating a method of joining a first thermoplastic component with a second thermoplastic component.

FIG. 6 illustrates a method 80 of joining a first thermoplastic component with a second thermoplastic component, similar to that described above. The method 80 optionally begins at 82 when an adhesive material is applied between a joint surface of the first thermoplastic component and a joint surface of a second thermoplastic component. Once the adhesive is applied (if at all), the method 80 proceeds to step 84, where the joint surface of the first thermoplastic component is abutted against the joint surface of the second thermoplastic component. As generally described above, the first thermoplastic component includes a thermoplastic protrusion extending from the joint surface, and the joint surface of the second thermoplastic component defines a receiving pocket adapted to receive the thermoplastic protrusion. Additionally, the step of abutting the joint surface of the first thermoplastic component against the joint surface of the second thermoplastic component (i.e., step 84) includes inserting the thermoplastic protrusion into the receiving pocket.

Once the first component abuts the second component, the method 80 includes, applying thermal energy to a heat-apply surface of the second thermoplastic component at step 86, where the heat-apply surface is opposite the joint surface of the second thermoplastic component. At step 88, the method includes melting a portion of the thermoplastic protrusion and a portion of the joint surface of the second thermoplastic component using the applied thermal energy. Finally, at step 90, the method 80 includes cooling the melted portion of the thermoplastic protrusion and the melted portion of the joint surface of the second thermoplastic component to fuse the first thermoplastic component with the second thermoplastic component.

In one configuration, the step of applying thermal energy to a heat-apply surface of the second thermoplastic component (i.e., step 86) includes contacting the heat-apply surface with a die and transmitting thermal energy to the second thermoplastic component via conduction. As described above, the thermal energy may be generated, for example, using a resistive heating element in thermal communication with the thermal die. Additionally, the thermal die may include a concave portion configured to mate with a corresponding domed portion of the heat-apply surface that may be opposite the receiving pocket of the second thermoplastic component. As such, contacting the heat-apply surface with a die includes nesting the domed portion within the concave portion of the die, and transmitting thermal energy to the second thermoplastic component includes conducting thermal energy through the domed portion.

Finally, as described above, to prevent adhesive from being expelled out to the heat-apply surface, where it may contact and/or contaminate the thermal die, the receiving pocket of the second thermoplastic component may be such that it does not extend through the heat-apply surface of the second thermoplastic component. Said another way, there may be a land portion of thermoplastic material disposed between the receiving pocket and the heat-apply surface. In the methods described herein, the adhesive may serve as the main joining means, where the thermally bonded staked pins may further enhance and/or offer additional shear and peel resistance.

While the best modes for carrying out the invention have been described in detail, those familiar with the art to which this invention relates will recognize various alternative designs and embodiments for practicing the invention within the scope of the appended claims. Additionally, all directional references, such as top and bottom, are meant solely to convey an understanding of the present invention and should not be regarded as limiting. It is intended that all matter contained in the above description or shown in the accompanying drawings shall be interpreted as illustrative only and not as limiting.

The invention claimed is:

1. A thermoplastic joint assembly comprising:
   a first plate formed from a thermoplastic material, the first plate having a first joint surface and including a thermoplastic protrusion extending from the first joint surface;
   a second plate formed from the thermoplastic material, the second plate including:
      a second joint surface configured to mate with the first joint surface of the first plate and including a receiving pocket extending into the second plate;
      a heat-apply surface opposite the second joint surface, including a local area having a land portion separating the receiving pocket from the heat-apply surface, the land portion including a domed portion opposite the receiving pocket;
      wherein the domed portion is configured to provide a reference identifier of a location of the thermoplastic protrusion; and
      wherein the receiving pocket does not extend through the heat-apply surface;
   wherein the receiving pocket of the second plate is adapted to receive the protrusion of the first plate when the first joint surface abuts the second joint surface;
   wherein the local area of the heat-apply surface of the second plate is configured to contact a thermal die having a temperature above a melting point of the thermoplastic to conduct thermal energy into the second plate; and
   wherein the conducted thermal energy melts the local area of the second plate proximate the receiving pocket and melts the protrusion of the first plate such that the second plate and the first plate locally fuse together when the thermal energy is removed.

2. The thermoplastic joint assembly of claim 1, further comprising an adhesive material disposed between and in contact with each of the first joint surface and the second joint surface.

3. The thermoplastic joint assembly of claim 1, wherein the thermoplastic protrusion is a cylindrical protrusion.

\* \* \* \* \*